US012781897B2

(12) United States Patent
Anderson

(10) Patent No.: US 12,781,897 B2
(45) Date of Patent: Nov. 3, 2026

(54) FLUID CONNECTION ASSEMBLY AND FLUID CONNECTION ASSEMBLY CONNECT AND DISCONNECT TOOLS

(71) Applicant: Oetiker NY, Inc., Lancaster, NY (US)

(72) Inventor: Thomas A. Anderson, North Tonawanda, NY (US)

(73) Assignee: Oetiker NY, Inc., Lancaster, NY (US)

( * ) Notice: Subject to any disclaimer, the term of this patent is extended or adjusted under 35 U.S.C. 154(b) by 337 days.

(21) Appl. No.: 18/555,630

(22) PCT Filed: May 19, 2021

(86) PCT No.: PCT/US2021/033112
§ 371 (c)(1),
(2) Date: Oct. 16, 2023

(87) PCT Pub. No.: WO2022/245345
PCT Pub. Date: Nov. 24, 2022

(65) Prior Publication Data
US 2024/0191820 A1 Jun. 13, 2024

(51) Int. Cl.
*F16L 37/091* (2006.01)
*F16L 37/12* (2006.01)

(52) U.S. Cl.
CPC ........... *F16L 37/0915* (2016.05); *F16L 37/12* (2013.01)

(58) Field of Classification Search
CPC .............................. F16L 37/0915; F16L 37/12
See application file for complete search history.

(56) References Cited

U.S. PATENT DOCUMENTS

| | | | | | |
|---|---|---|---|---|---|
| 3,922,011 | A | * | 11/1975 | Walters | F16L 37/088 285/902 |
| 4,988,316 | A | | 1/1991 | Roy | |
| 5,211,427 | A | * | 5/1993 | Washizu | F16L 37/0885 285/305 |
| 5,704,658 | A | | 1/1998 | Tozaki et al. | |
| 5,979,946 | A | * | 11/1999 | Petersen | F16L 37/0885 285/305 |

(Continued)

FOREIGN PATENT DOCUMENTS

| | | |
|---|---|---|
| CN | 202264195 | 6/2012 |
| CN | 106707475 | 5/2017 |

(Continued)

*Primary Examiner* — James M Hewitt, II
(74) *Attorney, Agent, or Firm* — Harter Secrest & Emery LLP; Michael Nicholas Vranjes

(57) ABSTRACT

A fluid connection assembly, including a connector body, including a first end, a second end, a through-bore, and a first radially outward facing surface including a groove, the groove including a second radially outward facing surface and a first aperture, and a retainer operatively arranged to be removably connected to the connector body, the retainer including a first engaging member, including a first radially inward facing surface, and a first protrusion extending from the first radially inward facing surface, the first protrusion operatively arranged to extend through the first aperture and into the through-bore, and a second engaging member including a second radially inward facing surface, wherein the second engaging member is connected to the first engaging member by a plurality of pivotably connected arms.

20 Claims, 12 Drawing Sheets

(56) References Cited

U.S. PATENT DOCUMENTS

| | | | | |
|---|---|---|---|---|
| 6,260,889 | B1 * | 7/2001 | Tozaki ................ | F16L 37/0885<br>285/321 |
| 6,517,120 | B1 * | 2/2003 | Miyajima ........... | F16L 37/0985<br>285/305 |
| 8,253,043 | B1 | 8/2012 | Kiely | |
| 8,439,406 | B2 | 5/2013 | Slack | |
| 9,115,837 | B2 * | 8/2015 | Barthel ................. | F16L 37/252 |
| 9,246,273 | B2 | 1/2016 | Montet et al. | |
| 9,616,559 | B2 | 4/2017 | Slack | |
| 10,125,908 | B2 * | 11/2018 | Kujawski, Jr. ........ | F16L 37/413 |
| 2014/0125051 | A1 | 5/2014 | Barthel et al. | |
| 2015/0159793 | A1 | 6/2015 | Nagaya | |
| 2016/0245441 | A1 | 8/2016 | Klein et al. | |
| 2019/0063654 | A1 | 2/2019 | Unger et al. | |
| 2020/0166167 | A1 * | 5/2020 | Hagen ................. | F16L 37/0885 |

FOREIGN PATENT DOCUMENTS

| | | | |
|---|---|---|---|
| JP | S6289593 | U | 6/1987 |
| JP | H0522253 | U | 3/1993 |
| JP | H10238679 | A | 9/1998 |
| JP | H1182849 | A | 3/1999 |
| JP | 2002372182 | A | 12/2002 |
| JP | 2019066033 | A | 4/2019 |
| WO | 2012173058 | A1 | 12/2012 |
| WO | 2021009455 | | 1/2021 |

* cited by examiner

FLUID CONNECTION ASSEMBLY AND FLUID CONNECTION ASSEMBLY CONNECT AND DISCONNECT TOOLS

CROSS-REFERENCE TO RELATED APPLICATIONS

The present application is the U.S. National Stage Application pursuant to 35 U.S.C. § 371 of International Patent Application No. PCT/US2021/033112, filed on May 19, 2021, which application is hereby incorporated by reference herein in its entirety.

FIELD

The present disclosure relates to fluid connectors, and, more particularly, to a fluid connection assembly including a retainer that decreases the insertion force required for assembly and allows for quick assembly without the need for tools.

BACKGROUND

Fluid connectors, fluid connections, and fluid connection assemblies are integral components for many applications, and especially for automotive applications. Since an automotive system is made up of various components such as a radiator, transmission, and engine, fluid must be able to travel not only within each component but also between components. An example of fluid traveling between components is the transmission fluid traveling from the transmission to the transmission oil cooler in order to lower the temperature of the transmission fluid. Fluid predominantly moves between components via flexible or rigid hoses which connect to each component by fluid connectors. Such fluid connectors typically include a retaining clip, retaining ring clip, or snap ring carried on the connector body which is adapted to snap behind a raised shoulder of a tube when the tube is fully inserted into the connector body. However, during the assembly process, installation of the retaining clip onto the connector body is difficult and failure to install the retaining clip properly can jeopardize the structural integrity of the retaining clip. Additionally, the force required to engage the tube into the connector body, and overcome the radial force of the retaining clip, is very large with current designs. Also, since the retaining clips are very thin and small, it is easy to lose them if dropped or misplaced. Furthermore, some connection assembly solutions take a long time to secure and require tools for the assembly process.

Thus, there has been a long-felt need for a fluid connection assembly including a retainer that allows for disassembly, is easier to assembly, and reduces the insertion force required to assemble the fluid connector.

SUMMARY

According to aspects illustrated herein, there is provided a fluid connection assembly, comprising a connector body, including a first end, a second end, a through-bore, and a first radially outward facing surface comprising a groove, the groove including a second radially outward facing surface and a first aperture, and a retainer operatively arranged to be removably connected to the connector body, the retainer including a first engaging member, including a first radially inward facing surface, and a first protrusion extending from the first radially inward facing surface, the first protrusion operatively arranged to extend through the first aperture and into the through-bore, and a second engaging member including a second radially inward facing surface, wherein the second engaging member is connected to the first engaging member by a plurality of pivotably connected arms.

In some embodiments, the retainer is operatively arranged to engage the groove. In some embodiments, the first radially inward facing surface and the second radially inward facing surface abut against the second radially outward facing surface. In some embodiments, the groove further comprises a second aperture, and the second engaging member further comprises a second protrusion extending from the second radially inward facing surface, the second protrusion operatively arranged to extend through the second aperture and into the through-bore. In some embodiments, the first protrusion comprises a first surface facing in a first axial direction, a second surface facing in a second axial direction, and a third surface connecting the first surface and the second surface, the third surface facing radially inward. In some embodiments, the first surface is perpendicular to the first radially inward facing surface, and the second surface is not perpendicular to the first radially inward facing surface. In some embodiments, the plurality of pivotably connected arms comprises a first arm pivotably connected to the first engaging member, a second arm pivotably connected to the first arm, and a third arm pivotably connected to the second arm and pivotably connected to the second engaging member. In some embodiments, the first arm extends radially outward in a first circumferential direction from the first engaging member, and the third arm extends radially inward in the first circumferential direction from the second arm. In some embodiments, the retainer further comprises at least one hook extending radially outward from at least one of the first engaging member and the second engaging member. In some embodiments, to remove the retainer from the connector body, the first engaging member and the second engaging member are displaced radially outward to disengage the first protrusion from the first aperture. In some embodiments, the fluid connection assembly further comprises a connect tool including a frusto-conical radially outward facing surface and a protrusion operatively arranged to engage the first end to connect the retainer to the connector body.

According to aspects illustrated herein, there is provided a fluid connection assembly, comprising a connector body, including a first end, a second end, a through-bore, and a first radially outward facing surface comprising a groove, the groove including a second radially outward facing surface, a first aperture, and a second aperture, a retainer operatively arranged to be removably connected to the connector body, the retainer including a first engaging member, including a first radially inward facing surface, and a first protrusion extending from the first radially inward facing surface, the first protrusion operatively arranged to extend through the first aperture and into the through-bore, and a second engaging member including a second radially inward facing surface, and a second protrusion extending from the second radially inward facing surface, the second protrusion operatively arranged to extend through the second aperture into the through-bore, wherein the second engaging member is connected to the first engaging member by a first plurality of pivotably connected arms, and a tube including a shoulder, wherein in a locked state the retainer secures the tube to the connector body.

In some embodiments, in the locked state the retainer is engaged with the groove. In some embodiments, the locked state the first radially inward facing surface and the second radially inward facing surface abut against the second radially outward facing surface. In some embodiments, at least one of the first protrusion and the second protrusion comprises a first surface facing in a first axial direction, a second surface facing in a second axial direction, and a third surface connecting the first surface and the second surface, the third surface facing radially inward. In some embodiments, the first surface is perpendicular to the first radially inward facing surface, and the second surface is not perpendicular to the first radially inward facing surface. In some embodiments, the first plurality of pivotably connected arms comprises a first arm pivotably connected to the first engaging member, a second arm pivotably connected to the first arm, and a third arm pivotably connected to the second arm and pivotably connected to the second engaging member. In some embodiments, the first arm extends radially outward in a first circumferential direction from the first engaging member, and the third arm extends radially inward in the first circumferential direction from the second arm. In some embodiments, the retainer further comprising a second plurality of pivotably connected arms connecting the first engaging member to the second engaging member, the first plurality of pivotably connected arms extend from the first engaging member in a first circumferential direction, and the second plurality of pivotably connected arms extend from the first engaging member in a second circumferential direction, opposite the first circumferential direction. In some embodiments, the retainer further comprises at least one hook extending radially outward from at least one of the first engaging member and the second engaging member.

According to aspects illustrated herein, there is provided a disconnect tool for a fluid connection assembly, comprising a first end, a second end, a through-bore extending from the first end to the second end, a first section, a second section connected to the first section, a first radially outward facing surface formed by at least one of the first section and the second section, the first radially outward facing surface extending from the first end to the second end, and at least one protrusion extending from the second end in a first axial direction, the at least one protrusion including a ramp surface.

In some embodiments, the first radially outward facing surface comprises a variable diameter from the first end to the second end. In some embodiments, the first radially outward facing surface comprises a constant diameter from the first end to the second end. In some embodiments, the second section is hingedly connected to the first section. In some embodiments, the second section is connected to the first section via a living hinge. In some embodiments, the living hinge protrudes radially outward from the first radially outward facing surface. In some embodiments, the at least one protrusion further comprises a second radially outward facing surface. In some embodiments, the ramp surface extends radially inward from the second radially outward facing surface in a first circumferential direction. In some embodiments, the second radially outward facing surface comprises a radially outward extending boss. In some embodiments, the boss is spherical. In some embodiments, the first radially outward facing surface comprises a first diameter, the second radially outward facing surface comprises a second diameter, and the second diameter is equal to the first diameter.

According to aspects illustrated herein, there is provided a disconnect tool for a fluid connection assembly including a connector body, a retainer, and a tube operatively arranged to be locked in the connector body by the retainer, the disconnect tool comprising a first end, a second end, a through-bore extending from the first end to the second end, a first section, a second section pivotably connected to the first section, a first radially outward facing surface formed by at least one of the first section and the second section, the first radially outward facing surface extending from the first end to the second end, and a plurality of protrusions extending from the second end in a first axial direction, the plurality of protrusions, the plurality of protrusions operatively arranged to displace the retainer radially outward with respect to the connector body and comprising at least a first protrusion connected to the first section and including a first ramp surface, and a second protrusion connected to the second section and circumferentially spaced from the first protrusion, the second protrusion including a second ramp surface.

In some embodiments, the first radially outward facing surface comprises a variable diameter from the first end to the second end. In some embodiments, the second section is connected to the first section via a living hinge. In some embodiments, the living hinge protrudes radially outward from the first radially outward facing surface. In some embodiments, the first protrusion comprises a second radially outward facing surface, the first ramp surface extends radially inward from the second radially outward facing surface in a first circumferential direction, and the second protrusion comprises a third radially outward facing surface, the second ramp surface extends radially inward from the third radially outward facing surface in the first circumferential direction. In some embodiments, the through-bore of the disconnect tool is operatively arranged to engage the tube axially and radially. In some embodiments, the second radially outward facing surface comprises a first radially outward extending boss, and the third radially outward facing surface comprises a second radially outward extending boss. In some embodiments, at least one of the first boss and the second boss is spherical. In some embodiments, the first radially outward facing surface comprises a first diameter, the second radially outward facing surface comprises a second diameter equal to the first diameter, and the third radially outward facing surface comprises a third diameter equal to the second diameter.

According to aspects illustrated herein, there is provided a fluid connection assembly or a fluid quick connect comprising a connector body, a retainer, and a tube. In some embodiments, the retainer is a compliant plastic retainer. The fluid quick connect provides quick connections with low force tube insertion of fluid lines during an assembly process and/or assembly line conditions. Further, the fluid quick connect provides easy serviceability with a low force tube removal process. The fluid quick connect provides the user an assembly that allows connection of fluid lines without the need for tools and other hardware. The retainer allows for low tube connection insertion forces as well as a low force removal process. The fluid quick connect also allows for disassembly and serviceability.

In some embodiments, the fluid connection assembly further comprises a removal or disconnect tool arranged to engage the tube, the retainer, and the connector body to disengage the retainer from the tube shoulder. In some embodiments, the disconnect tool comprises at least one protrusion including a ramp surface to displace the engaging member of the retainer radially outward. In some embodiments, the at least one protrusion also includes a raised boss on the radially outward facing surface for total clearance of the retainer's ramped retaining tooth (i.e., engaging members). In some embodiments, the disconnect tool comprises a first section hingedly connected to a second section, which allows for one-hand operation. The hinged design also allows the tool to radially engage the tube (i.e., the two sections can be opened and arranged around the tube, at which point the two sections can be closed together around the tube).

In some embodiments, the fluid connection assembly further comprises a compliant retaining ring installation tool or connect tool arranged to engage the connector body to allow the retainer to be easily assembled to the connector body. The connect tool comprises a radially outward facing frusto-conical surface and is operatively arranged to engage the connector body. The retainer is slid over the connect tool and onto the connector body. The connect tool allows for full expansion of joints of the retaining ring to allow the retaining ring to slip over the connector body.

The retainer comprises a plurality of joint like flex points, which allow the retainer to move and releasably engage the tube. In some embodiments, the retainer comprises one or more loops aligned with respective engaging members or teeth to allow for the removal or disengagement of retainer from the tube and/or connector body. Each of the engaging members or teeth comprise a ramped surface, designed to engage the tube shoulder upon insertion of the tube into the connector body. The ramped surfaces also allow for low tube insertion force and provides a more ergonomic friendly assembly. Each of the engaging members comprise a flat back surface opposite the ramped surface, which engages the tube shoulder in the locked position to prevent disassembly. In some embodiments, the retainer comprises a one-piece plastic ring shaped design. The retainer can be used with a number of style tube shoulder types.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

Figure 1:
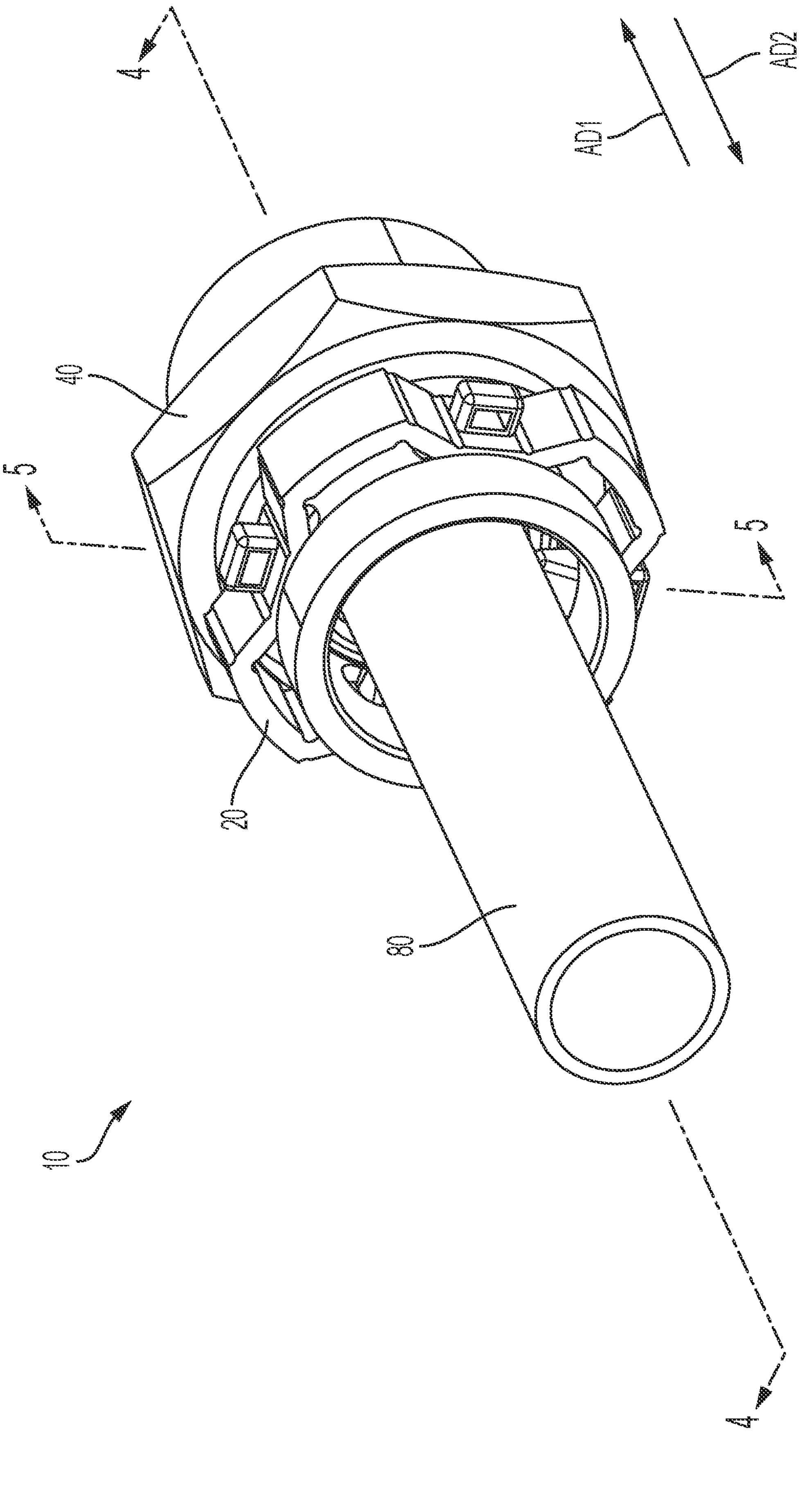
FIG. 1 is a front perspective view of a fluid connection assembly, in a locked state.

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, pneumatics, and/or springs.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" is used herein. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

It should be appreciated that the term "tube" as used herein is synonymous with hose, pipe, channel, conduit, tube end form, or any other suitable pipe flow used in hydraulics and fluid mechanics. It should further be appreciated that the term "tube" can mean a rigid or flexible conduit of any material suitable for containing and allowing the flow of a gas or a liquid.

Figure 2:
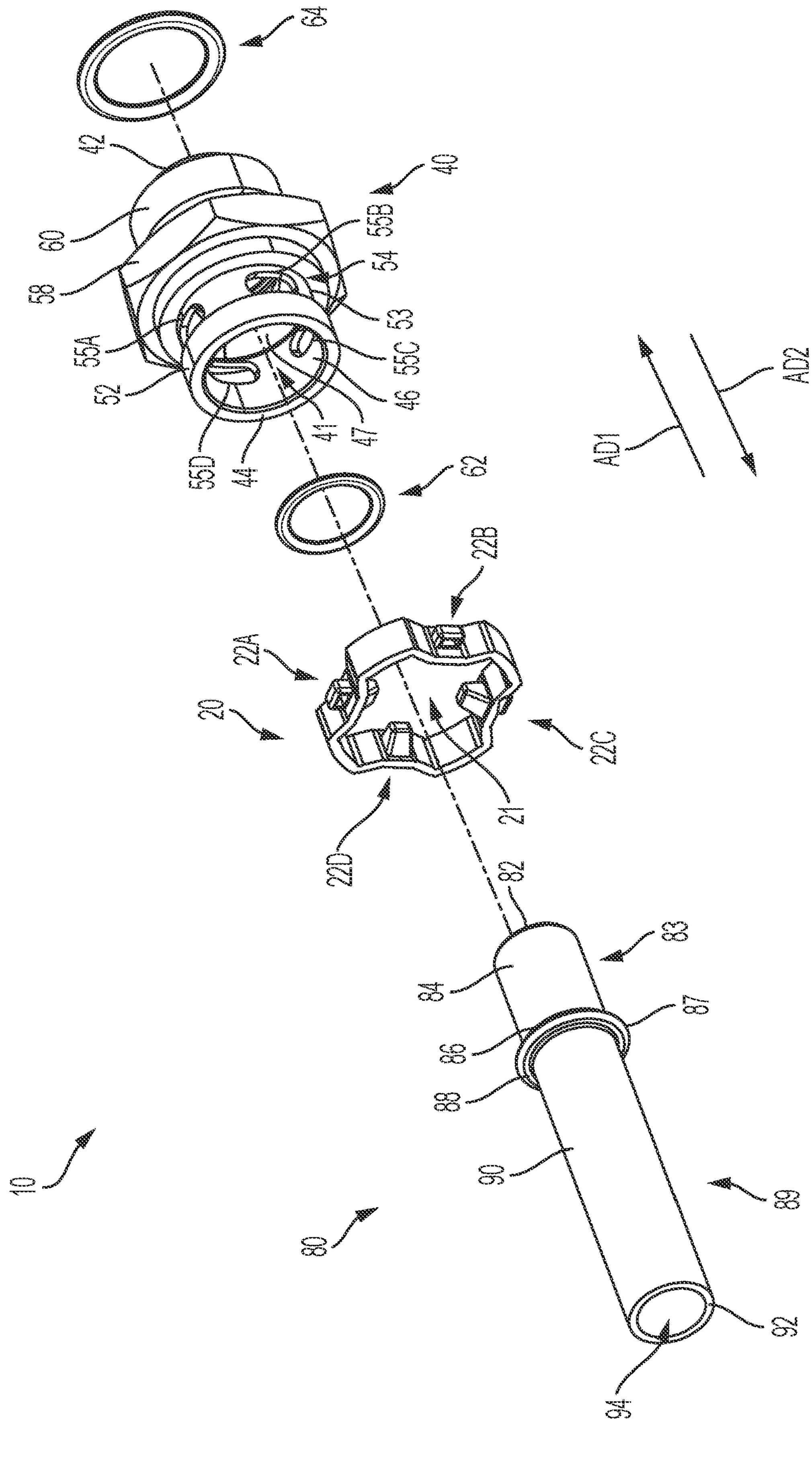
FIG. 2 is an exploded front perspective view of the fluid connection assembly shown in FIG. 1.

Adverting now to the figures, FIG. 1 is a front perspective view of fluid connection assembly 10, in a locked state. FIG. 2 is an exploded front perspective view of fluid connection assembly 10. Fluid connection assembly 10 generally comprises retainer 20, tube 80, and connector body 40. The following description should be read in view of FIGS. 1-2.

Tube 80 comprises end 82, section 83, bead or shoulder 87, section 89, end 92, and through-bore 94. Through-bore 94 extends through tube 80 from end 82 to end 92. Section 83 is arranged between end 82 and shoulder 87 and comprises radially outward facing surface 84. Radially outward facing surface 84 includes a substantially constant diameter. In some embodiments, radially outward facing surface 84 comprises a frusto-conical taper or curvilinear surface proximate end 82 (see FIG. 4). Shoulder 87 is arranged between section 83 and section 89 and comprises surface 86 and surface 88. In some embodiments, surface 86 is an axial surface facing at least partially in axial direction AD1 and surface 88 is an axial surface facing at least partially in axial direction AD2. In some embodiments, surface 86 is a frusto-conical surface extending from the radially outward facing surface of shoulder 87 radially inward in axial direction AD1. For example, surface 86 may be a linear conical shape and increases in diameter in axial direction AD2. In some embodiments, surface 86 may comprise linear portion and a conical or frusto-conical portion. Section 89 is arranged between shoulder 87 and end 92 and comprises radially outward facing surface 90. Radially outward facing surface 90 includes a substantially constant diameter. Tube 80 is arranged to be inserted, specifically with end 82 first, into connector body 40. Tube 80 is inserted into connector body 40 until section 83, or radially outward facing surface 84, engages seal 62 (see FIG. 4). Shoulder 87 is arranged outside of and axially spaced from connector body 40, at which point retainer 20 is assembled to secure tube 80 to connector body 40, as will be described in greater detail below. It should be appreciated that tube 80 may be any traditional tube or tube end form comprising a bead, radially outward extending protrusion or flange, or ramp profile, which extends radially outward and axially on the outer surface of the tube, to secure the tube within the connector body. In some embodiments, tube 80 comprises a metal. In some embodiments, tube 80 comprises a polymer. In some embodiments, tube 80 comprises a ceramic.

Figure 3A:
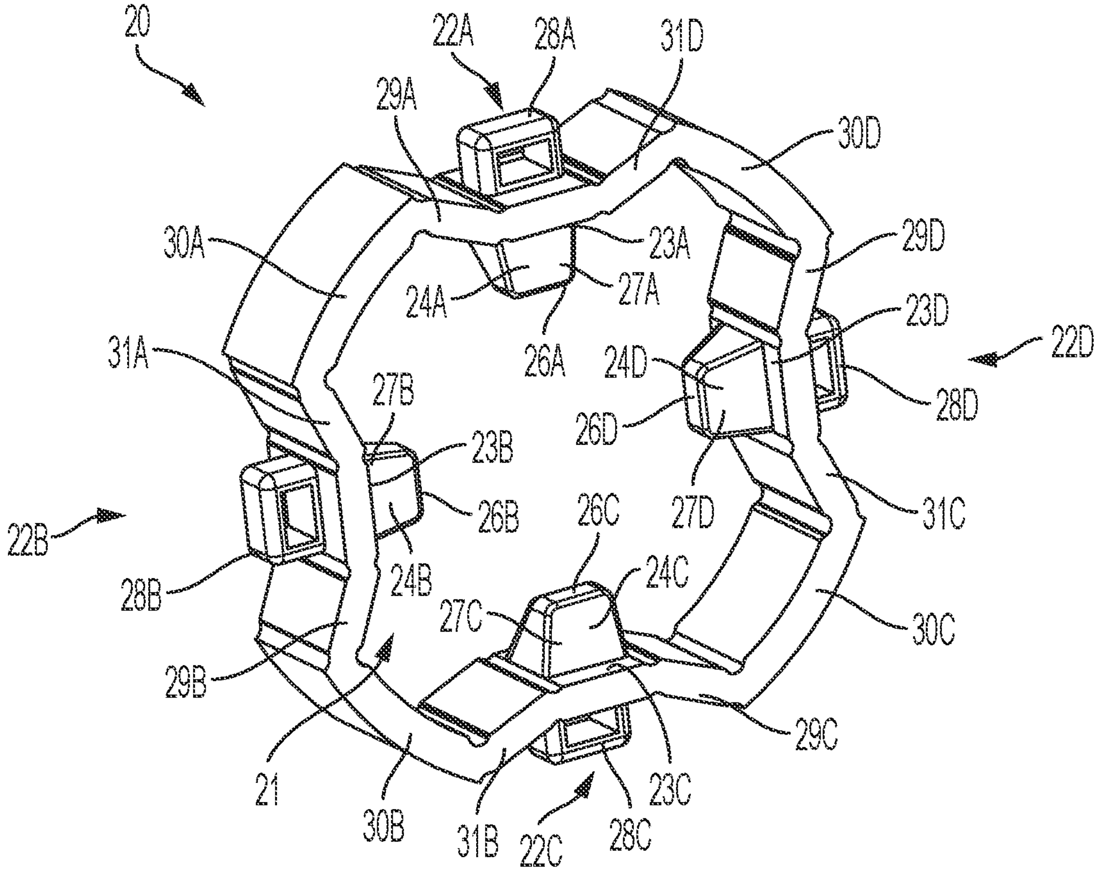
FIG. 3A is a rear perspective view of the retainer shown in FIG. 1.
Figure 3B:
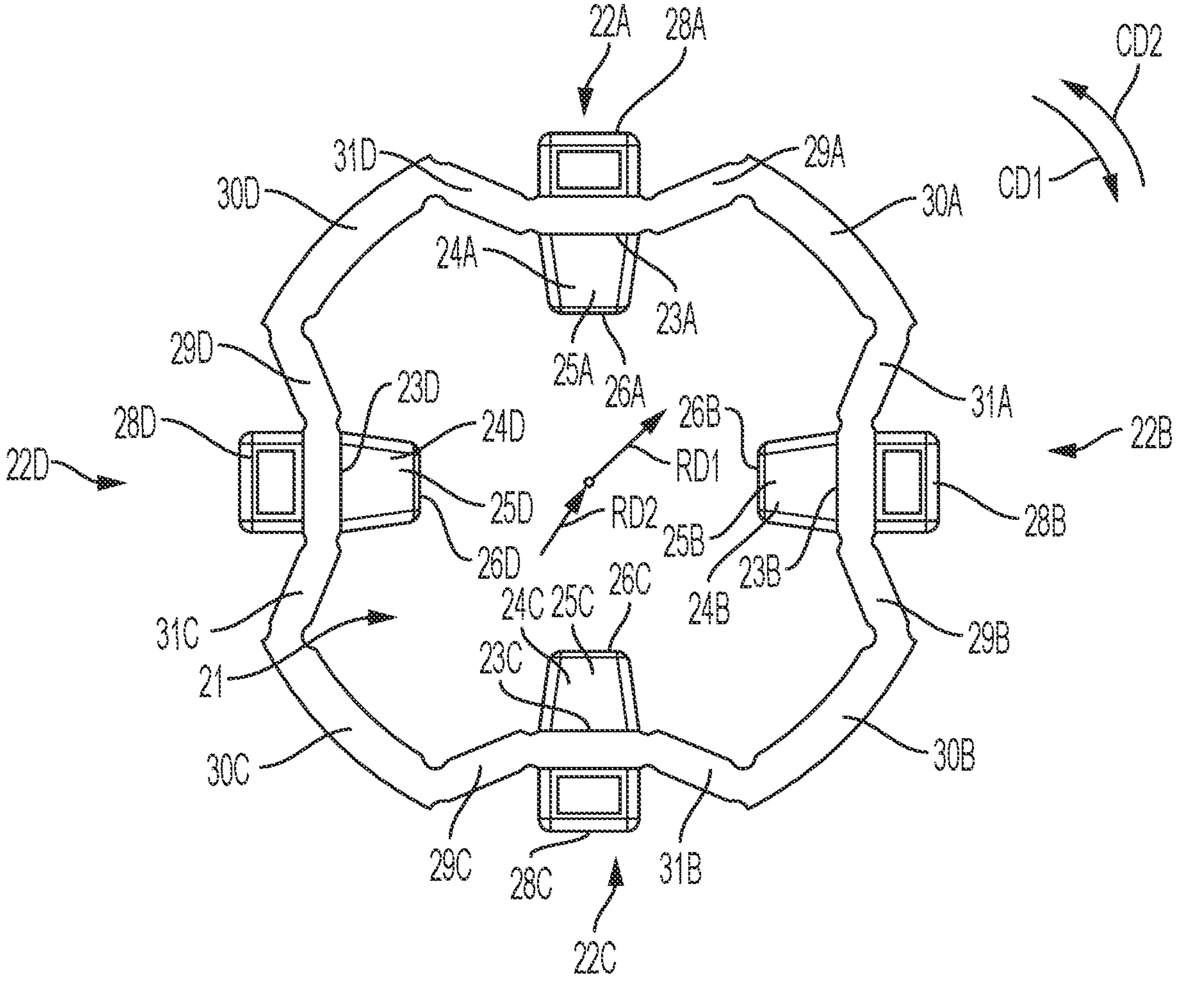
FIG. 3B is a front elevational view of the retainer shown in FIG. 3A.
Figure 4:
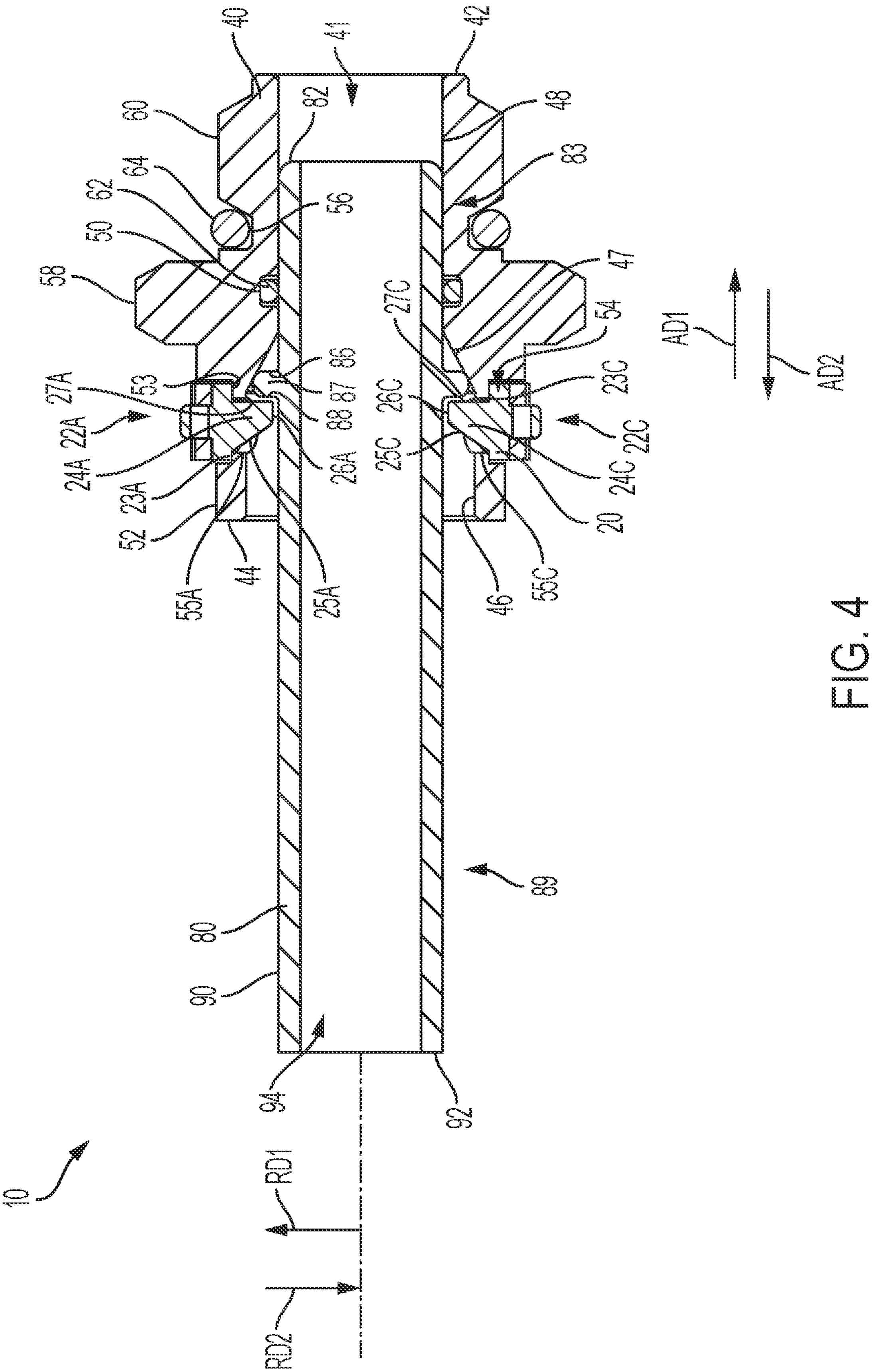
FIG. 4 is a cross-sectional view of the fluid connection assembly taken generally along line 4-4 in FIG. 1.
Figure 5:
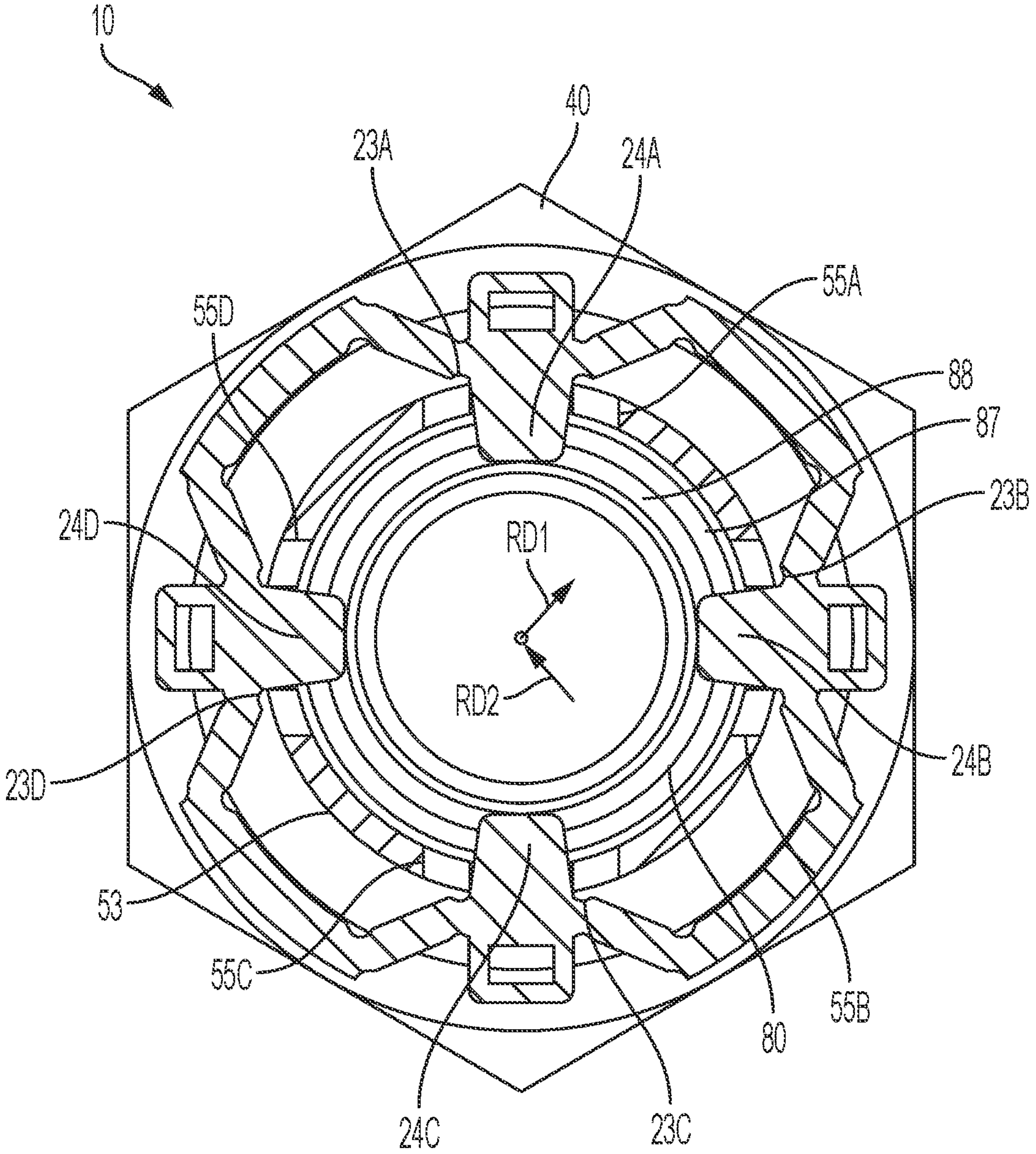
FIG. 5 is a cross-sectional view of the fluid connection assembly taken generally along line 5-5 in FIG. 1.

FIG. 3A is a rear perspective view of retainer 20. FIG. 3B is a front elevational view of retainer 20. FIG. 4 is a cross-sectional view of fluid connection assembly 10 taken generally along line 4-4 in FIG. 1. FIG. 5 is a cross-sectional view of the fluid connection assembly taken generally along line 5-5 in FIG. 1. The following description should be read in view of FIGS. 1-5.

Retainer 20 is generally ring shaped and comprises hole 21 and a plurality of engaging members, for example, engaging members 22A-D. In some embodiments, retainer 20 is a continuous ring. In some embodiments, retainer 20 comprises a metal. In some embodiments, retainer 20 comprises a polymer. In some embodiments, retainer 20 comprises a ceramic.

Engaging member 22A comprises radially inward facing surface 23A and protrusion 24A extending radially inward in radial direction RD2 from radially inward facing surface 23A. Radially inward facing surface 23A is operatively arranged to engage connector body 40 and specifically, to abut against radially outward facing surface 53 of groove 54. Protrusion 24A is operatively arranged to extend through an aperture in connector body 40, for example aperture 55A, to engage shoulder 87 of tube 80. Protrusion 24A comprises axial surface 25A, radially inward facing surface 26A, and axial surface 27A. In some embodiments, surface 25A is non-perpendicular to radially inward facing surface 23A, that is, surface 25A extends radially inward in axial direction AD1 (as best shown in FIGS. 2 and 4). The angle of surface 25A promotes radially outward expansion of engaging member 22A, and retainer 20, during insertion of tube 80 into connector body 40. In some embodiments, surface 27A is perpendicular to radially inward facing surface 23A, which prevents tube 80 from being removed from connector body 40. Radially inward facing surface 26A connects surface 25A and surface 27A. In some embodiments, radially inward facing surface 26A is parallel to radially inward facing surface 23A and/or perpendicular to surface 27A. In some embodiments, engaging member 22A further comprises hook or loop 28A extending radially outward therefrom. Hook 28A may be used to displace engaging member 22A radially outward and out of engagement with shoulder 87 of tube 80 and/or aperture 55A of connector body 40 (i.e., a tool can be used to pull on hook 28A in radial direction RD2).

Engaging member 22A is connected to engaging member 22B via a plurality of arms, for example, arms 29A, 30A, and 31A. Arm 29A is pivotably connected to engaging member 22A. Arm 29A extends radially outward from radially inward facing surface 23A in circumferential direction CD1. Arm 30A is pivotably connected to arm 29A and extends therefrom in circumferential direction CD1. Arm 31A is pivotably connected to arm 30A and extends radially inward therefrom in circumferential direction CD1. Arm 31A is also pivotably connected to engaging member 22B. It should be appreciated that the pivotable connections may be embodied as hinges, living hinges, or another suitable means. For example, arm 29A is pivotably connected to engaging member 22A via a living hinge, arm 30A is pivotably connected to arm 29A via a living hinge, arm 31A is connected to arm 30A via a living hinge, and arm 31A is connected to engaging member 22B via a living hinge. Since engaging member 22A is connected to engaging member 22B via a plurality of pivotably connected arms, it can be said that engaging member 22A and engaging member 22B are pivotably connected.

Engaging member 22B comprises radially inward facing surface 23B and protrusion 24B extending radially inward in radial direction RD2 from radially inward facing surface 23B. Radially inward facing surface 23B is operatively arranged to engage connector body 40 and specifically, to abut against radially outward facing surface 53 of groove 54. Protrusion 24B is operatively arranged to extend through an aperture in connector body 40, for example aperture 55B, to engage shoulder 87 of tube 80. Protrusion 24B comprises axial surface 25B, radially inward facing surface 26B, and axial surface 27B. In some embodiments, surface 25B is non-perpendicular to radially inward facing surface 23B, that is, surface 25B extends radially inward in axial direction AD1 (substantially similar to protrusion 24A). The angle of surface 25B promotes radially outward expansion of engaging member 22B, and retainer 20, during insertion of tube 80 into connector body 40. In some embodiments, surface 27B is perpendicular to radially inward facing surface 23B, which prevents tube 80 from being removed from connector body 40. Radially inward facing surface 26B connects surface 25B and surface 27B. In some embodiments, radially inward facing surface 26B is parallel to radially inward facing surface 23B and/or perpendicular to surface 27B. In some embodiments, engaging member 22B further comprises hook or loop 28B extending radially outward therefrom. Hook 28B may be used to displace engaging member 22B radially outward and out of engagement with shoulder 87 of tube 80 and/or aperture 55B of connector body 40 (i.e., a tool can be used to pull on hook 28B in radial direction RD2).

Engaging member 22B is connected to engaging member 22C via a plurality of arms, for example, arms 29B, 30B, and 31B. Arm 29B is pivotably connected to engaging member 22B. Arm 29B extends radially outward from radially inward facing surface 23B in circumferential direction CD1. Arm 30B is pivotably connected to arm 29B and extends therefrom in circumferential direction CD1. Arm 31B is pivotably connected to arm 30B and extends radially inward therefrom in circumferential direction CD1. Arm 31B is also pivotably connected to engaging member 22C. It should be appreciated that the pivotable connections may be embodied as hinges, living hinges, or another suitable means. For example, arm 29B is pivotably connected to engaging member 22B via a living hinge, arm 30B is pivotably connected to arm 29B via a living hinge, arm 31B is connected to arm 30B via a living hinge, and arm 31B is connected to engaging member 22C via a living hinge. Since engaging member 22B is connected to engaging member 22C via a plurality of pivotably connected arms, it can be said that engaging member 22B and engaging member 22C are pivotably connected.

Engaging member 22C comprises radially inward facing surface 23C and protrusion 24C extending radially inward in radial direction RD2 from radially inward facing surface 23C. Radially inward facing surface 23C is operatively arranged to engage connector body 40 and specifically, to abut against radially outward facing surface 53 of groove 54. Protrusion 24C is operatively arranged to extend through an aperture in connector body 40, for example aperture 55C, to engage shoulder 87 of tube 80. Protrusion 24C comprises axial surface 25C, radially inward facing surface 26C, and axial surface 27C. In some embodiments, surface 25C is non-perpendicular to radially inward facing surface 23C, that is, surface 25C extends radially inward in axial direction AD1 (as best shown in FIGS. 2 and 4). The angle of surface 25C promotes radially outward expansion of engaging member 22C, and retainer 20, during insertion of tube 80 into connector body 40. In some embodiments, surface 27C is perpendicular to radially inward facing surface 23C, which prevents tube 80 from being removed from connector body 40. Radially inward facing surface 26C connects surface 25C and surface 27C. In some embodiments, radially inward facing surface 26C is parallel to radially inward facing surface 23C and/or perpendicular to surface 27C. In some embodiments, engaging member 22C further comprises hook or loop 28C extending radially outward therefrom. Hook 28C may be used to displace engaging member 22C radially outward and out of engagement with shoulder 87 of tube 80 and/or aperture 55C of connector body 40 (i.e., a tool can be used to pull on hook 28C in radial direction RD2).

Engaging member 22C is connected to engaging member 22D via a plurality of arms, for example, arms 29C, 30C, and 31C. Arm 29C is pivotably connected to engaging member 22C. Arm 29C extends radially outward from radially inward facing surface 23C in circumferential direction CD1. Arm 30C is pivotably connected to arm 29C and extends therefrom in circumferential direction CD1. Arm 31C is pivotably connected to arm 30C and extends radially inward therefrom in circumferential direction CD1. Arm 31C is also pivotably connected to engaging member 22D. It should be appreciated that the pivotable connections may be embodied as hinges, living hinges, or another suitable means. For example, arm 29C is pivotably connected to engaging member 22C via a living hinge, arm 30C is pivotably connected to arm 29C via a living hinge, arm 31C is connected to arm 30C via a living hinge, and arm 31C is connected to engaging member 22D via a living hinge. Since engaging member 22C is connected to engaging member 22D via a plurality of pivotably connected arms, it can be said that engaging member 22C and engaging member 22D are pivotably connected.

Engaging member 22D comprises radially inward facing surface 23D and protrusion 24D extending radially inward in radial direction RD2 from radially inward facing surface 23D. Radially inward facing surface 23D is operatively arranged to engage connector body 40 and specifically, to abut against radially outward facing surface 53 of groove 54. Protrusion 24D is operatively arranged to extend through an aperture in connector body 40, for example aperture 55D, to engage shoulder 87 of tube 80. Protrusion 24D comprises axial surface 25D, radially inward facing surface 26D, and axial surface 27D. In some embodiments, surface 25D is non-perpendicular to radially inward facing surface 23D, that is, surface 25D extends radially inward in axial direction AD1 (as best shown in FIGS. 2 and 4). The angle of surface 25D promotes radially outward expansion of engaging member 22D, and retainer 20, during insertion of tube 80 into connector body 40. In some embodiments, surface 27D is perpendicular to radially inward facing surface 23D, which prevents tube 80 from being removed from connector body 40. Radially inward facing surface 26D connects surface 25D and surface 27D. In some embodiments, radially inward facing surface 26D is parallel to radially inward facing surface 23D and/or perpendicular to surface 27D. In some embodiments, engaging member 22D further comprises hook or loop 28D extending radially outward therefrom. Hook 28D may be used to displace engaging member 22D radially outward and out of engagement with shoulder

87 of tube 80 and/or aperture 55D of connector body 40 (i.e., a tool can be used to pull on hook 28D in radial direction RD2).

Engaging member 22D is connected to engaging member 22A via a plurality of arms, for example, arms 29D, 30D, and 31D. Arm 29D is pivotably connected to engaging member 22D. Arm 29D extends radially outward from radially inward facing surface 23D in circumferential direction CD1. Arm 30D is pivotably connected to arm 29D and extends therefrom in circumferential direction CD1. Arm 31D is pivotably connected to arm 30D and extends radially inward therefrom in circumferential direction CD1. Arm 31D is also pivotably connected to engaging member 22A. It should be appreciated that the pivotable connections may be embodied as hinges, living hinges, or another suitable means. For example, arm 29D is pivotably connected to engaging member 22D via a living hinge, arm 30D is pivotably connected to arm 29D via a living hinge, arm 31D is connected to arm 30D via a living hinge, and arm 31D is connected to engaging member 22A via a living hinge. Since engaging member 22D is connected to engaging member 22A via a plurality of pivotably connected arms, it can be said that engaging member 22D and engaging member 22A are pivotably connected.

Connector body 40 comprises through-bore 41 extending from end 42 to end 44, radially inward facing surface 46, radially inward facing surface 48, groove 50, radially outward facing surface 52, groove 54, head 58, and radially outward facing surface 60. Connector body 40 is arranged to be connected to a component that is filled with a fluid or through which fluid flows. For example, connector body 40 may be connected to a refrigeration compressor or a transmission via radially outward facing surface 60, which may comprise external threading. Connector body 40 may be screwed into a threaded hole in the compressor via head 58 (e.g., using a wrench), which is then filled with refrigerant fluid. In some embodiments, head 58 is hexagonal; however, it should be appreciated that head 58 may comprise any geometry suitable for applying torque to connector body 40. Another component in which fluid connector 10, specifically connector body 40, may be installed into is a condenser, evaporator, or pump. It should be appreciated that fluid connector 10 may be used in various other components, assemblies, and subassemblies in which fluid connection is desired. Radially outward facing surface 60 may further comprise groove 56. Seal or O-ring 64 is arranged in groove 56 to create a fluid tight seal between connector body 40 and the component it is connected to.

Seal 62 is arranged in connector body 40. Specifically, seal 62 is arranged in groove 50. Groove 50 is arranged in radially inward facing surface 48. In some embodiments, seal 62 is an O-ring. In some embodiments, radially inward facing surface 46 is a cylindrical surface that extends from end 44 to surface 47. Radially inward facing surface 46 is connected to radially inward facing surface 48 via surface 47. In some embodiments, surface 47 is a frusto-conical surface that connects generally cylindrical radially inward facing surface 46 with generally cylindrical radially inward facing surface 48. In some embodiments, surface 47 is an axial surface facing in axial direction AD2. In some embodiments, radially inward facing surface 48 is a cylindrical surface that extends from end 42 to surface 47.

Groove 54 is arranged in radially outward facing surface 52 and comprises radially outward facing surface 53. The diameter of radially outward facing surface 53 is less than the diameter of radially outward facing surface 52. Groove 54 is arranged axially between end 44 and head 58. In some embodiments, groove 54 is arranged immediately adjacent to head 58. Groove 54 is operatively arranged to engage with retainer 20, and specifically, radially inward facing surface 23A-D to connect retainer 20 to connector body 40. Groove 54 further comprises at least one aperture, for example, apertures 55A-D. Apertures 55A-D are operatively arranged to engage with engaging members 22A-D, and specifically, protrusions 24A-D, respectively, such that retainer 20 can engage shoulder 87 to lock tube 80 within connector body 40. In some embodiments, connector body 40 comprises a metal. In some embodiments, connector body 40 comprises a polymer. In some embodiments, connector body 40 comprises a ceramic.

To assemble fluid connection assembly 10, retainer 20 is arranged on connector body 40 such that radially inward facing surfaces 23A-D are engaged with radially outward facing surface 53 of groove 54 and protrusions 24A-D are engaged with apertures 55A-D (see FIGS. 4-5). Retainer 20 should be oriented such that surfaces 25A-D are facing axial direction AD1 and surfaces 27A-D are facing axial direction AD2. To assemble retainer 20 on connector body 40, engaging members 22A-D should be displaced radially outward in radial direction RD1 such that protrusions 24A-D clear radially outward facing surface 52, at which point retainer 20 is slid onto connector body 40 in axial direction AD1. This can be done using a tool that engages hooks 28A-D for radial expansion or tool 100, as will be described in greater detail below.

Tube 80 is then inserted in axial direction AD1, with end 82 first, into connector body 40. Radially outward facing surface 84 engages seal 62 and section 83 is arranged inside of connector body 40 proximate radially inward facing surface 48. As shoulder 87 engages surfaces 25A-D of protrusions 24A-D it forces engaging members 22A-D radially outward in radial direction RD1. Once shoulder 87 clears radially inward facing surfaces 26A-D (i.e., is arranged on axially between protrusions 24A-D and surface 47), engaging members 22A-D snap back radially inward in radial direction RD2 to form the locked state. In the locked state, shoulder 87 engages surface 47 and surfaces 27A-D. Surface 47 prevents shoulder 87 and thus tube 80 from displacing in axial direction AD1, and surfaces 27A-D prevent shoulder 87 and thus tube 80 from displacing in axial direction AD2 with respect to connector body 40. As such, the engagement of retainer 20 with connector body 40 and tube 80 prevents displacement of tube 80 in axial directions AD1 and AD2, as well as radial directions RD1 and RD2, relative to connector body 40. To unlock fluid connection assembly 10, engaging members 22A-D are displaced radially outward in radial direction RD1 to expand retainer 20 until protrusions 24A-D disengage shoulder 87, at which point tube 80 can be removed from connector body 40.

Figure 6:
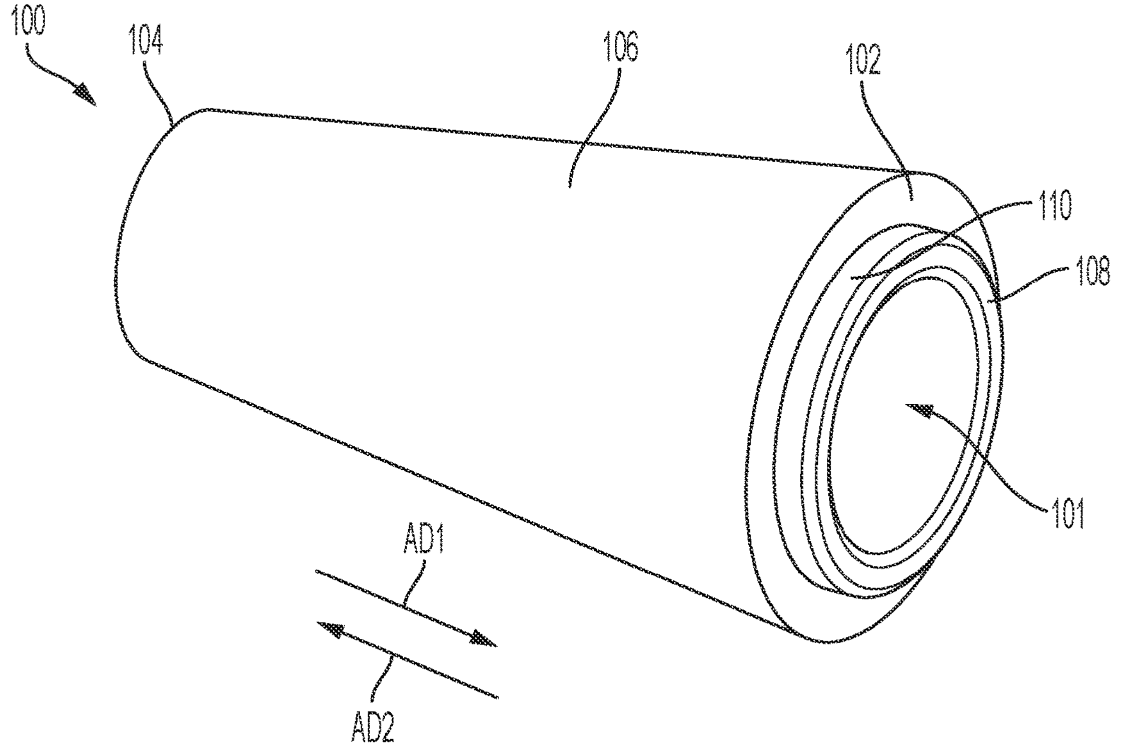
FIG. 6 is a perspective view of a connect tool.
Figure 7:
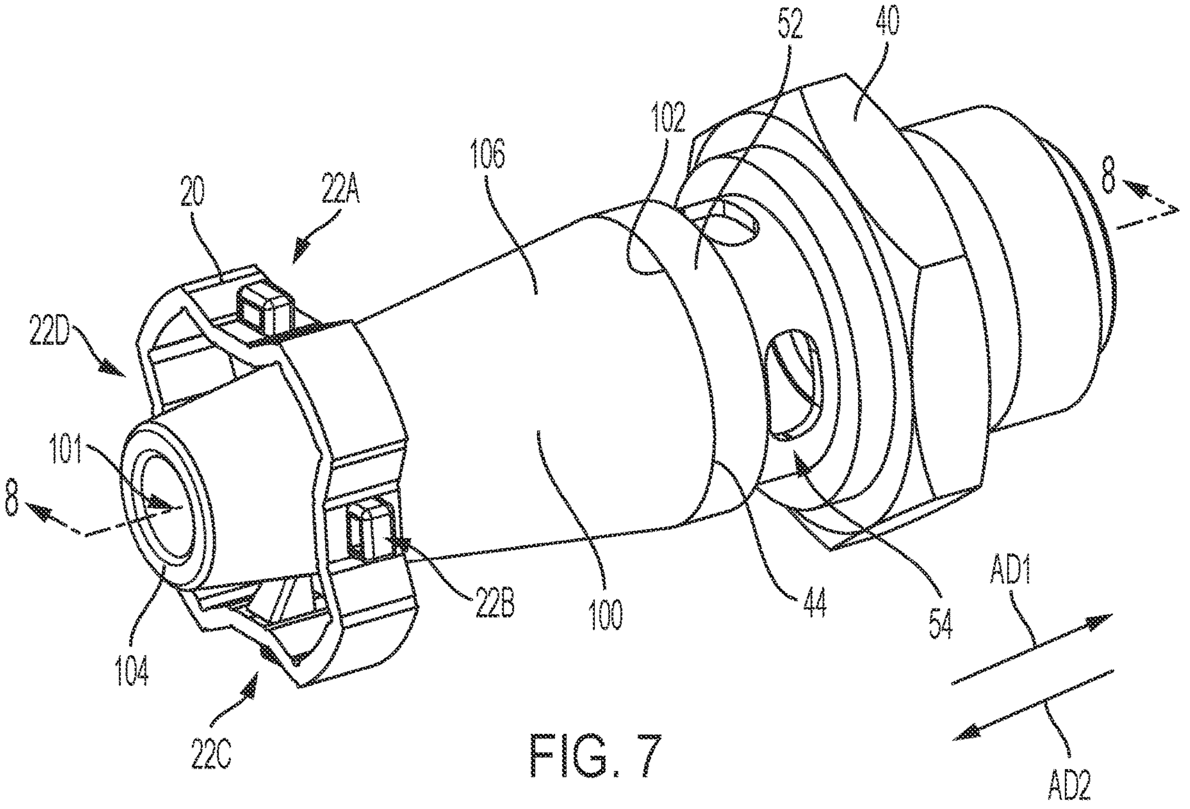
FIG. 7 is a perspective view of the connect tool shown in FIG. 6 engaged with a connector body.
Figure 8:
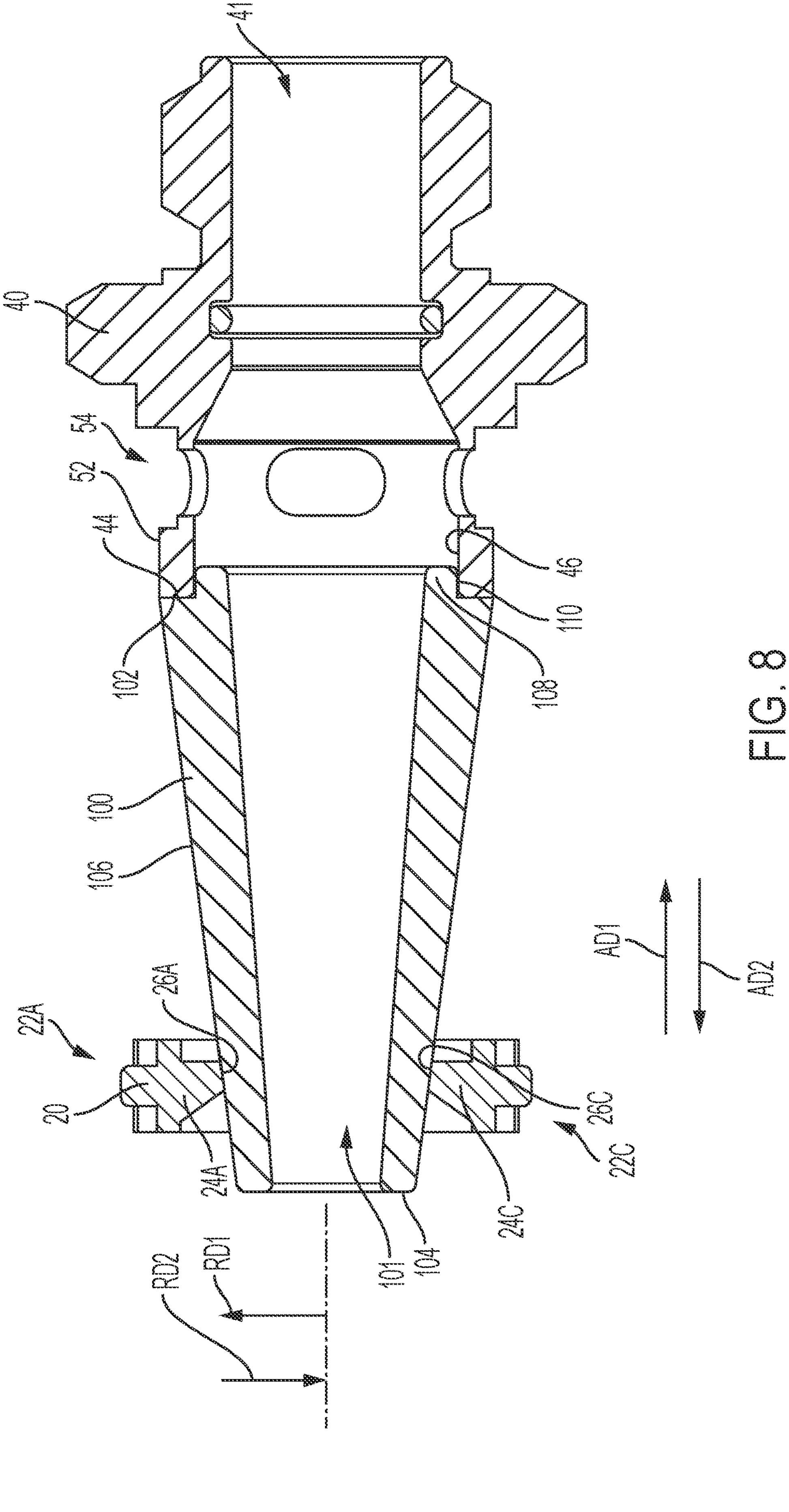
FIG. 8 is a cross-sectional view of the connect tool engaged with the connector body taken generally along line 8-8 in FIG. 7.

FIG. 6 is a perspective view of connect or assembly tool 100. FIG. 7 is a perspective view of connect tool 100 engaged with connector body 40. FIG. 8 is a cross-sectional view of connect tool 100 engaged with connector body 40 taken generally along line 8-8 in FIG. 7. The following description should be read in view of FIGS. 1-8.

Connect tool 100 generally comprises end 102, end 104, and radially outward facing surface 106 extending from end 102 to end 104. Radially outward facing surface 106 is frusto-conical and increases in diameter in axial direction AD1. Thus, the diameter of radially outward facing surface 106 at end 102 is greater than the diameter of radially outward facing surface 106 at end 104. Connect tool 100 further comprises protrusion 108 extending in axial direction AD1 from end 102. Protrusion 108 comprises radially outward facing surface 110. Radially outward facing surface 110 comprises a diameter that is less than the diameter of radially outward facing surface 106 at end 102. In some embodiments, connect tool 100 further comprises through-hole 101. In some embodiments, through-hole 101 is frustoconical (see FIG. 8). In some embodiments, through-hole 101 is cylindrical.

Connect tool 100 is operatively arranged to engage connector body 40 such that retainer 20 can be assembled to connector body 40. As best shown in FIGS. 7-8, connect tool 100 is engaged with connector body 40 by inserting protrusion 108 into through-bore 41 until end 102 abuts against end 44. Radially outward facing surface 110 is engaged with or abuts against radially inward facing surface 46. In some embodiments, the diameter of radially outward facing surface 106 at end 102 is greater than the diameter of radially outward facing surface 52. In some embodiments, the diameter of radially outward facing surface 106 at end 102 is equal to the diameter of radially outward facing surface 52. Once fully engaged, retainer 20 is slid along connect tool 100 in axial direction AD1. As retainer 20 is displaced in axial direction AD1 along connect tool 100, protrusions 24A-D, and specifically radially inward facing surfaces 26A-D, engage radially outward facing surface 106 thereby displacing engaging members 22A-D radially outward in radial direction RD1. Once retainer 20 reaches end 102 it has expanded such that radially inward facing surfaces 26A-D clear radially outward facing surface 52 and retainer 20 can be slid into groove 54. Once retainer 20 is properly positioned within groove 54, connect tool 100 can be removed from connector body 40, and subsequently tube 80 can then be inserted into connector body 40.

Figure 9A:
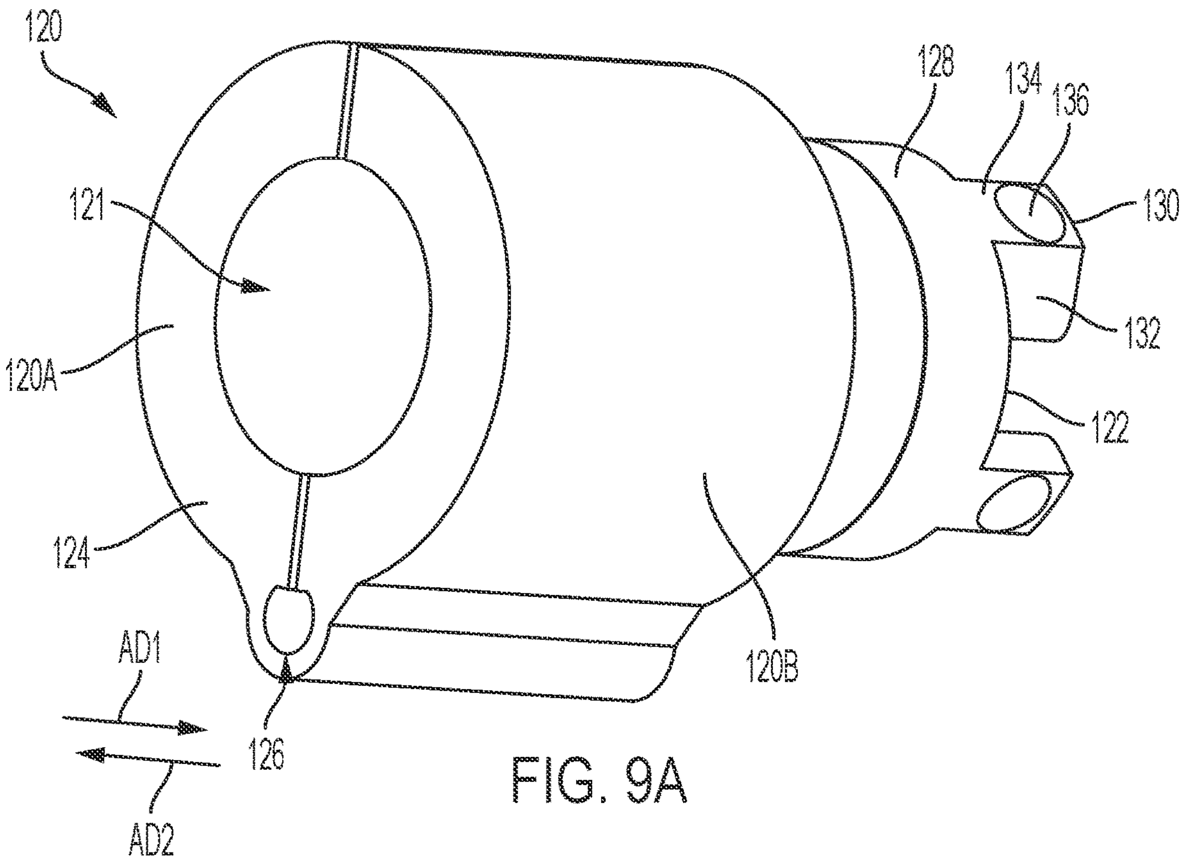
FIG. 9A is a front perspective view of a disconnect tool.
Figure 9B:
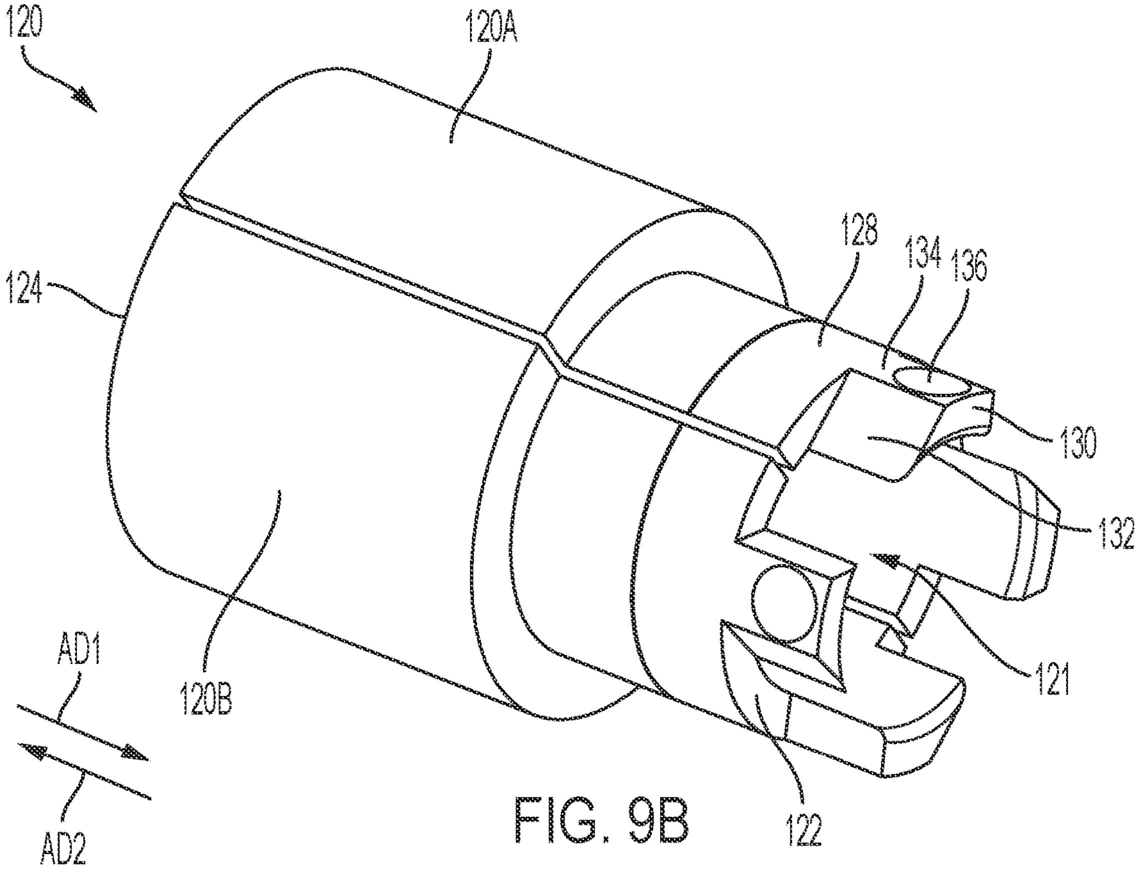
FIG. 9B is a rear perspective view of the disconnect tool shown in FIG. 9A.
Figure 10:
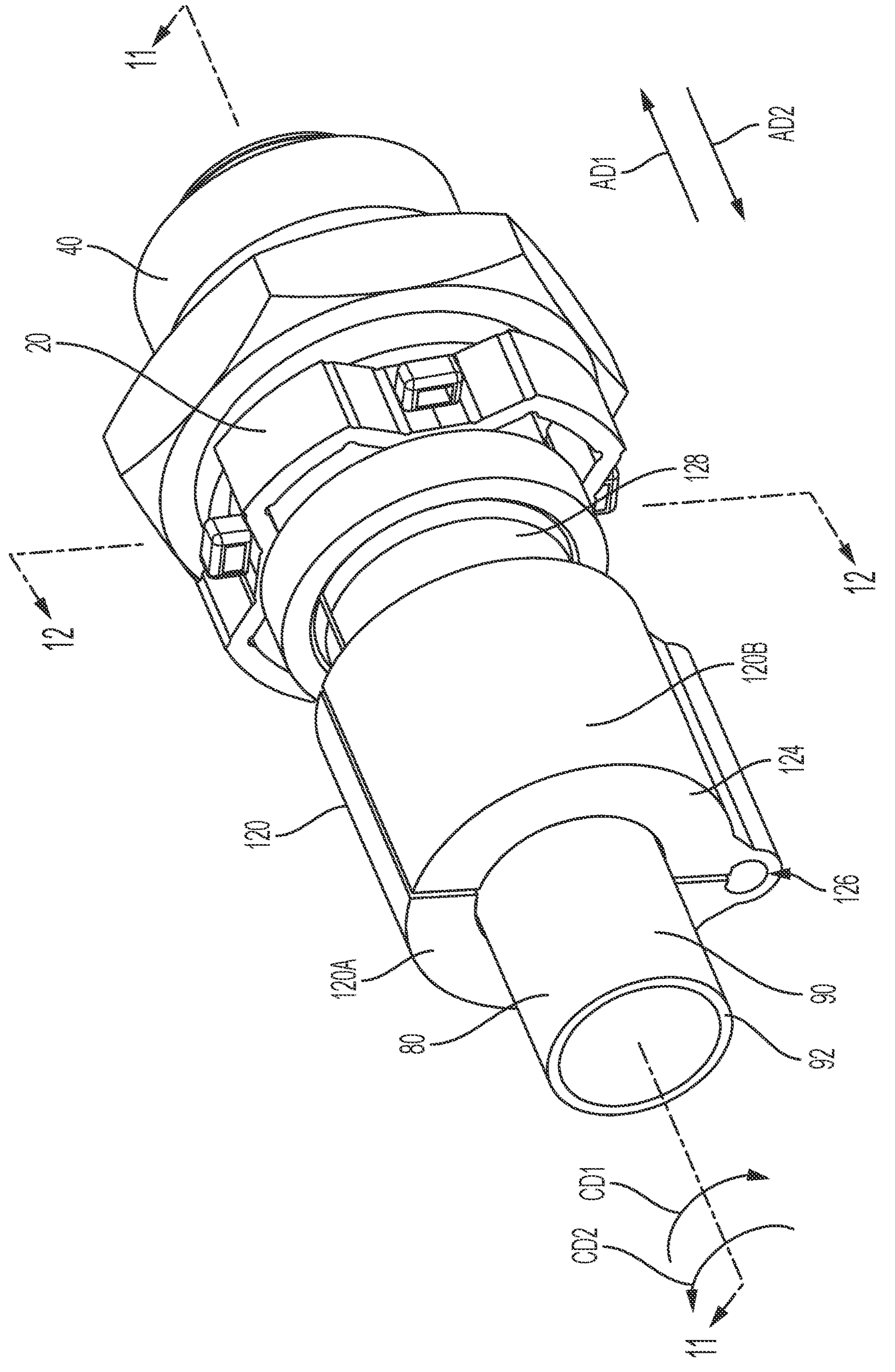
FIG. 10 is a perspective view of the disconnect tool shown in FIG. 9A engaged with a fluid connection assembly.
Figure 11:
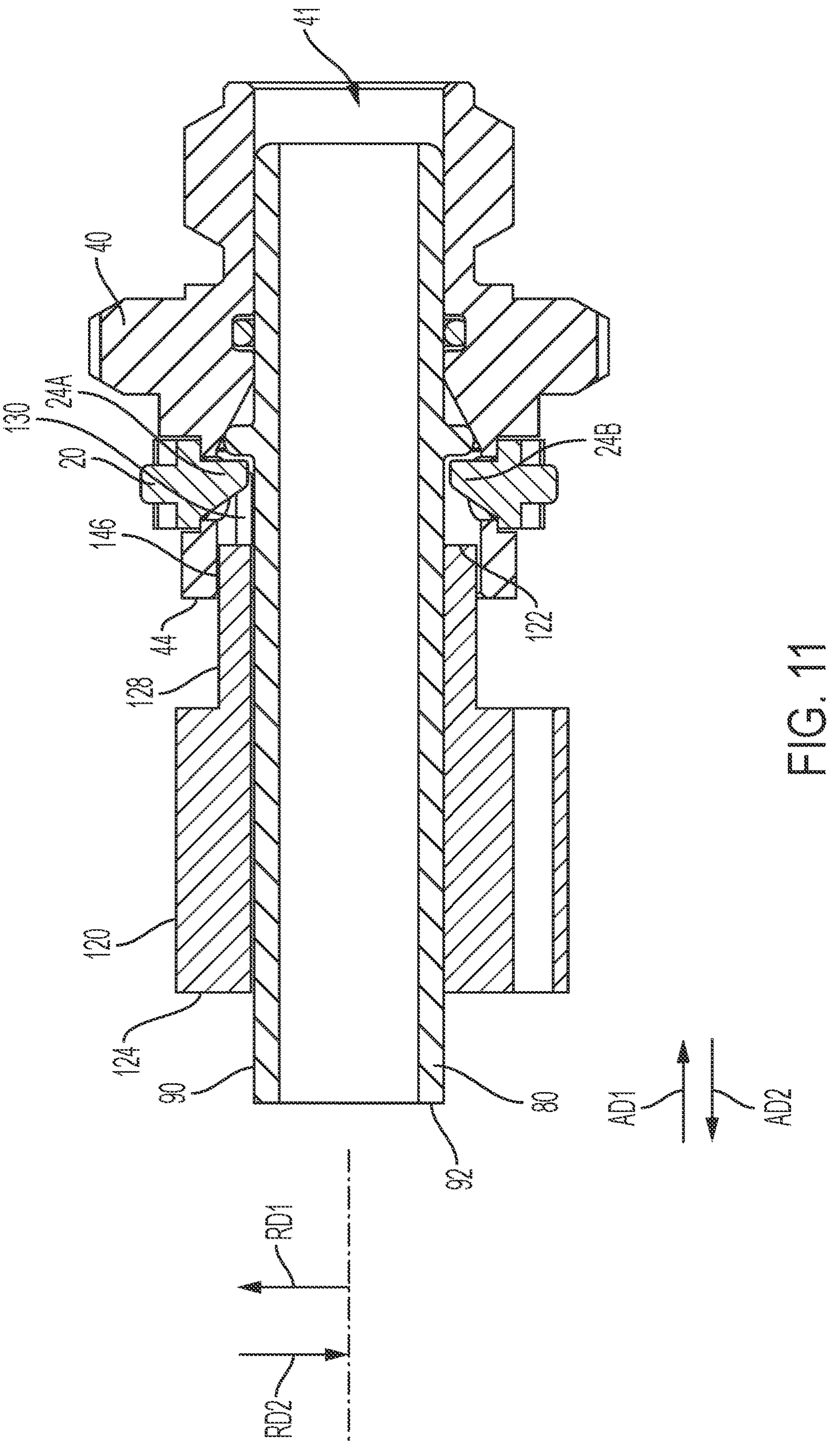
FIG. 11 is a cross-sectional view of the disconnect tool engaged with the fluid connection assembly taken generally along line 11-11 in FIG. 10; and, FIG. 12 is a cross-sectional view of the disconnect tool engaged with the fluid connection assembly taken generally along line 12-12 in FIG. 10.
Figure 12:
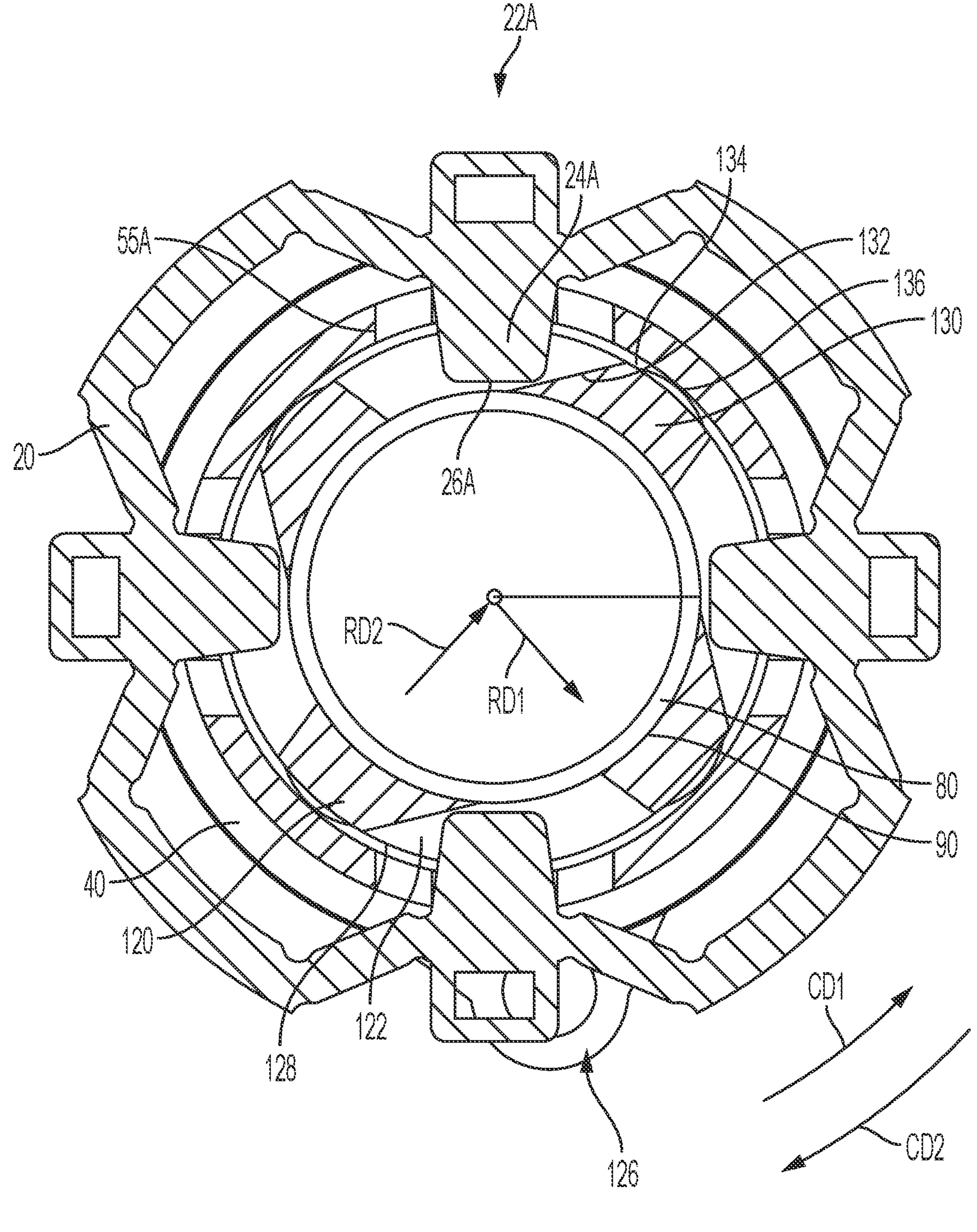

FIG. 9A is a front perspective view of disconnect tool 120. FIG. 9B is a rear perspective view of disconnect tool 120. FIG. 10 is a perspective view of disconnect tool 120 engaged with fluid connection assembly 10. FIG. 11 is a cross-sectional view of disconnect tool 120 engaged with fluid connection assembly 10 taken generally along line 11-11 in FIG. 10. FIG. 12 is a cross-sectional view of disconnect tool 120 engaged with fluid connection assembly 10 taken generally along line 12-12 in FIG. 10. The following description should be read in view of FIGS. 1-5 and 9A-12.

Disconnect tool 120 generally comprises section 120A, section 120B, end 122, end 124, radially outward facing surface 128, and through-bore 121. In some embodiments, section 120B is hingedly or pivotably connected to section 120A, for example, via hinged connection 126. Hinged connection 126 may be, for example, a hinge, a living hinge, or some other means for pivotable connection. Radially outward facing surface 128 extends from end 122 to end 124. The hinged connection between sections 120A and 120B allows disconnect tool 120 to radially engage tube 80 as opposed to axially slid thereon from end 92. As shown in the drawings, hinged connection 126 protrudes radially outward, in radial direction RD1, from radially outward facing surface 128 or sections 120A-B. In other words, hinged connection 126 is offset from sections 120A-B.

In some embodiments, and as shown, radially outward facing surface 128 is stepped (i.e., varies in diameter). In some embodiments, radially outward facing surface 128 comprises a constant diameter. Proximate end 122, radially outward facing surface 128 comprises a diameter that is less than the diameter of radially inward facing surface 146. Furthermore, the diameter of through-bore 121 is greater than the diameter of radially outward facing surface 90. This allows end 122 to be slid radially between connector body 40 and tube 80, specifically, radially inward facing surface 146 and radially outward facing surface 90, to engage protrusions 24A-D.

Disconnect tool 120 further comprises one or more protrusions, for example protrusions 130. Protrusions 130 extend from end 122 in axial direction AD1 and are operatively arranged to engage protrusions 24A-D. Each of protrusions 130 comprises ramp or circumferential ramp surface 132 and radially outward facing surface 134. In some embodiments, radially outward facing surface 134 is radially aligned with radially outward facing surface 128 (i.e., the diameter of radially outward facing surface 134 is equal to the diameter of radially outward facing surface 128). Ramp 132 extends from radially outward facing surface 134 to through-bore 121. Specifically, the diameter of ramp 132 decreases in circumferential direction CD1 (see FIG. 12). Ramps 132 are operatively arranged to engage protrusions 124A-D to radially expand engaging members 122A-D. In some embodiments, radially outward facing surface 134 further comprises boss 136 protruding therefrom. Bosses 136 are arranged to engage protrusions 124A-D to further displace engaging members 122A-D radially outward to clear shoulder 87 and/or apertures 55A-B. In some embodiments, bosses 136 are spherical in shape.

To disconnect tube 80 from connector body 40 when fluid connection assembly 10 is in the locked position, disconnect tool 120 is first concentrically engaged with tube 80, and specifically, radially outward facing surface 90, with protrusions 130 directed toward connector body 40 in axial direction AD1. This can be done by axially sliding disconnect tool 120 onto tube 80 from end 92 or, and as previously described, displacing section 120B away from section 120A an then radially positioning disconnect tool 120 around tube 80 such that through-bore 121 engages radially outward facing surface 90. Disconnect tool 120 is then displaced along tube 80 in axial direction AD1 until protrusions 130 engage protrusions 24A-D. By "engage" it is meant that protrusions 130 should be arranged circumferential between protrusions 24A-D, as best shown in FIG. 12. Disconnect tool 120 is then displaced in circumferential direction CD1 such that ramps 132 engage protrusions 24A-D. Ramps 132 force radially inward facing surfaces 26A-D radially outward in radial direction RD1. Once radially inward facing surfaces 26A-D are aligned with and positioned on radially outward facing surfaces 134 and/or bosses 136, protrusions 24A-D are disengaged with shoulder 87 and both tube 80 and disconnect tool 120 can be removed from connector body 40 in axial direction AD2. That is to say, the outermost diameter of radially outward facing surfaces 134 and/or bosses 136 are greater than or equal to the outermost diameter of shoulder 87. In some embodiments, when radially inward facing surfaces 26A-D are aligned with and arranged on radially outward facing surfaces 134 and/or bosses 136, retainer 20 can be removed from groove 54 and thus connector body 40. As such, in some embodiments disconnect tool 120 can be used to unlock tube 80 from connector body 40 as well as to remove retainer 20 from connector body 40.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMERALS

10 Fluid connection assembly
20 Retainer
20A Section
20B Section
21 Hole
22A Engaging member
22B Engaging member
22C Engaging member
22D Engaging member
23A Radially inward facing surface
23B Radially inward facing surface
23C Radially inward facing surface
23D Radially inward facing surface
24A Protrusion
24B Protrusion
24C Protrusion
24D Protrusion
25A Surface
25B Surface
25C Surface
25D Surface
26A Surface
26B Surface
26C Surface
26D Surface
27A Surface
27B Surface
27C Surface
27D Surface
28A Hook
28B Hook
28C Hook
28D Hook
29A Arm
29B Arm
29C Arm
29D Arm
30A Arm
30B Arm
30C Arm
30D Arm
31A Arm
31B Arm
31C Arm
31D Arm
40 Connector body
41 Through-bore
42 End
44 End
46 Radially inward facing surface
48 Radially inward facing surface
50 Groove
52 Radially outward facing surface
53 Radially outward facing surface
54 Groove
55A Aperture
55B Aperture
55C Aperture
55D Aperture
56 Groove
58 Head
60 Radially outward facing surface
62 Seal
64 Seal
80 Tube
82 End
83 Section
84 Radially outward facing surface
86 Surface
87 Shoulder or bead
88 Surface
89 Section
90 Radially outward facing surface
92 End
94 Through-bore
100 Connect tool
101 Through-hole
102 End
104 End
106 Radially outward facing surface
108 Protrusion
110 Radially outward facing surface
120 Disconnect tool
120A Section
120B Section
121 Hole
122 End
124 End
126 Hinge or hinged connection
128 Radially outward facing surface
130 Protrusion
132 Ramp or ramp surface
134 Radially outward facing surface
136 Boss
AD1 Axial direction
AD2 Axial direction
CD1 Circumferential direction
CD2 Circumferential direction
RD1 Radial direction
RD2 Radial direction

What is claimed is:

1. A fluid connection assembly, comprising:
a connector body, including:
a first end;
a second end;
a through-bore; and
a first radially outward facing surface comprising a groove, the groove including a second radially outward facing surface and a first aperture; and
a retainer operatively arranged to be removably connected to the connector body, the retainer including:
a first engaging member, including:
a first radially inward facing planar surface; and
a first protrusion extending from the first radially inward facing planar surface, the first protrusion operatively arranged to extend through the first aperture and into the through-bore; and
a second engaging member including a second radially inward facing surface, wherein the second engaging member is connected to the first engaging member by a plurality of pivotably connected arms.

2. The fluid connection assembly as recited in claim 1, wherein the retainer is operatively arranged to engage the groove.

3. The fluid connection assembly as recited in claim 1, wherein the first radially inward facing planar surface and the second radially inward facing surface abut against the second radially outward facing surface.

4. The fluid connection assembly as recited in claim 3, wherein:
the groove further comprises a second aperture; and the second engaging member further comprises a second protrusion extending from the second radially inward facing surface, the second protrusion operatively arranged to extend through the second aperture and into the through-bore.

5. The fluid connection assembly as recited in claim 1, wherein the first protrusion comprises:

a first surface facing in a first axial direction;

a second surface facing in a second axial direction; and a third surface connecting the first surface and the second surface, the third surface facing radially inward.

6. The fluid connection assembly as recited in claim 5, wherein:

the first surface is perpendicular to the first radially inward facing planar surface; and the second surface is not perpendicular to the first radially inward facing planar surface.

7. The fluid connection assembly as recited in claim 1, wherein the plurality of pivotably connected arms comprises:

a first arm pivotably connected to the first engaging member;

a second arm pivotably connected to the first arm; and a third arm pivotably connected to the second arm and pivotably connected to the second engaging member.

8. The fluid connection assembly as recited in claim 7, wherein:

the first arm extends radially outward in a first circumferential direction from the first engaging member; and the third arm extends radially inward in the first circumferential direction from the second arm.

9. The fluid connection assembly as recited in claim 1, wherein the retainer further comprises a hook extending radially outward from the first engaging member, wherein the hook is aligned with the first protrusion in a circumferential direction.

10. The fluid connection assembly as recited in claim 1, wherein to remove the retainer from the connector body, the first engaging member and the second engaging member are displaced radially outward to disengage the first protrusion from the first aperture.

11. The fluid connection assembly as recited in claim 1, further comprising a connect tool including a frusto-conical radially outward facing surface and a protrusion operatively arranged to engage the first end to connect the retainer to the connector body.

12. A fluid connection assembly, comprising:

a connector body, including:

a first end;

a second end;

a through-bore; and a first radially outward facing surface comprising a groove, the groove including a second radially outward facing surface, a first aperture, and a second aperture;

a retainer operatively arranged to be removably connected to the connector body, the retainer including:

a first engaging member, including:

a first radially inward facing surface; and a first protrusion extending from the first radially inward facing surface, the first protrusion operatively arranged to extend through the first aperture and into the through-bore; and a second engaging member including:

a second radially inward facing surface; and a second protrusion extending from the second radially inward facing surface, the second protrusion operatively arranged to extend through the second aperture into the through-bore, wherein the second engaging member is connected to the first engaging member by a first plurality of pivotably connected arms extending from the first engaging member in a first circumferential direction, and the second engaging member is connected to the first engaging member by a second plurality of pivotably connected arms extending from the first engaging member in a second circumferential direction, opposite the first circumferential direction; and a tube including a shoulder, wherein in a locked state the retainer secures the tube to the connector body.

13. The fluid connection assembly as recited in claim 12, wherein in the locked state the retainer is engaged with the groove.

14. The fluid connection assembly as recited in claim 12, wherein in the locked state the first radially inward facing surface and the second radially inward facing surface abut against the second radially outward facing surface.

15. The fluid connection assembly as recited in claim 12, wherein at least one of the first protrusion and the second protrusion comprises:

a first surface facing in a first axial direction;

a second surface facing in a second axial direction; and a third surface connecting the first surface and the second surface, the third surface facing radially inward.

16. The fluid connection assembly as recited in claim 15, wherein:

the first surface is perpendicular to the first radially inward facing surface; and the second surface is not perpendicular to the first radially inward facing surface.

17. The fluid connection assembly as recited in claim 12, wherein the first plurality of pivotably connected arms comprises:

a first arm pivotably connected to the first engaging member;

a second arm pivotably connected to the first arm; and a third arm pivotably connected to the second arm and pivotably connected to the second engaging member.

18. The fluid connection assembly as recited in claim 17, wherein:

the first arm extends radially outward in a first circumferential direction from the first engaging member; and the third arm extends radially inward in the first circumferential direction from the second arm.

19. The fluid connection assembly as recited in claim 12, wherein the retainer further comprises at least one hook extending radially outward from at least one of the first engaging member and the second engaging member.

20. A fluid connection assembly, comprising:

a connector body, including:

a first end;

a second end;

a through-bore; and a first radially outward facing surface comprising a groove, the groove including a second radially outward facing surface and a first aperture; and a retainer operatively arranged to be removably connected to the connector body, the retainer having a continuous ring shape and including:

a first engaging member, including:

a first radially inward facing surface; and a first protrusion extending from the first radially inward facing surface, the first protrusion operatively arranged to extend through the first aperture and into the through-bore; and a second engaging member including a second radially inward facing surface, wherein the second engaging member is connected to the first engaging member by a plurality of pivotably connected arms.

* * * * *